March 23, 1965  H. MITTAG  3,175,147
ALTERNATING CURRENT GENERATOR REGULATOR WITH
TEMPERATURE DEPENDENT CONTROL MEANS
Filed May 16, 1961

INVENTOR
HERMANN MITTAG

By
Michael S. Striker
Attorney

United States Patent Office 3,175,147
Patented Mar. 23, 1965

3,175,147
ALTERNATING CURRENT GENERATOR REGULATOR WITH TEMPERATURE DEPENDENT CONTROL MEANS
Hermann Mittag, Stuttgart-Botnang, Germany, assignor to Robert Bosch G.m.b.H., Stuttgart, Germany
Filed May 16, 1961, Ser. No. 110,550
Claims priority, application Germany, May 21, 1960, B 57,948
20 Claims. (Cl. 322—33)

The present invention concerns a voltage regulator arrangement for an alternating current generator, particularly a single-phase or a three-phase generator furnishing electrical energy via at least one rectifier to a storage battery and to other current consuming devices. A voltage regulator arrangement of this type usually comprises a voltage regulator which reduces the output voltage of the generator by reducing the exciter current in the exciter winding of the generator whenever the output voltage of the generator tends to exceed a predetermined value. A most appropriate use for arrangements of this type are the lighting installations in motor vehicles.

In comparison with direct current generators having a collector and used for similar purposes, alternating current generators are advantageous because there are no commutation difficulties so that this type of generator can be subjected to higher loads. However, since this type of generator has to supply direct current consumers it has to cooperate with rectifiers which are usually located or mounted within the generator housing. The generator is conventionally cooled by a built-in ventilator.

It has been found that just in view of this cooling arrangement difficulties develop at low rotary speeds of the generator because under these circumstances the rectifiers mounted within the generator housing are not sufficiently cooled and are therefore likely to become overheated.

It is therefore a main object of this invention to provide for a voltage regulator arrangement of the type set forth, which however is capable of reducing the generator output voltage in response to rising temperatures of the rectifiers.

It is a further object of this invention to provide for an arrangement of the above mentioned type which is particularly efficient and simple in construction on account of a suitable combination of the rectifiers and the means which cause the above mentioned regulation in response to rising temperatures of the rectifiers.

With the above objects in view the invention provides in a direct current supply system including an alternating current generator, in combination, rectifier means connected in circuit with the output terminals of the generator for converting its alternating current voltage output into direct current output voltage; voltage regulator means for regulating said direct current output voltage; and temperature-dependent control means structurally combined with said rectifier means and actuated by temperature increase of said rectifier means beyond a predtermined temperature, said control means being connected with said regulator means so as to cause the latter to reduce said direct current output voltage when the temperature of said rectifier means exceeds said predetermined temperature.

In a preferred embodiment of the invention applying to a generator with a rectifier or rectifiers comprising a semiconductor including a rectifying p-n-junction, a resistor element is arranged as closely as possible to a portion of the rectifier which is close to the p-n-junction. For this purpose a particularly suitable portion of the rectifier is an input or output electrode of the rectifier soldered to the semiconductor. In order to obtain a satisfactory and efficient current regulation depending upon the varying temperature of the rectifier or rectifiers, the individual temperature-dependent resistor element should have such a characteristic that the resistance of this resistor changes to a comparatively considerable degree at that temperature which is the maximum permissible temperature for the rectifier or rectifiers. Under these conditions the voltage regulator is capable of regulating the output voltage of the generator in such a manner that, irrespective of the amount of cooling applied, the temperature of the rectifier caused by the amount of load current passing therethrough never exceeds the critical maximum value.

According to a preferred embodiment of the invention, the voltage regulator is equipped, in addition to a voltage coil actuated by the voltage to be regulated, with a second control coil which is connected in series with the above mentioned temperature-dependent resistor between the output lines carrying the output voltage of the generator.

According to a further development of the invention, in the case of a multi-phase, preferably a three-phase generator, each of the rectifiers directly connected to one of the output terminals of the generator is to be associated and structurally combined with one temperature-dependent resistor. In this case, it is advisable to connect all these resistors in series with each other and with the above mentioned control coil. Hereby the output voltage of the generator is considerably reduced by the action of the temperature-dependent resistors also if one of the rectifiers directly connected to the positive or to the negative terminal of the generator should fail which would normally cause an overload for the remaining rectifiers. In any case, the direction of the flow of current in the control coil and the direction of turn of this coil is to be chosen in such a manner that the magnetic field produced by the control coil is opposed to the magnetic field produced by the voltage coil.

The novel features are considered as characteristic for the invention as set forth in particular in the appended claims. The invention itself, however, both as to its construction and its method of operation together with additional objects and advantages thereof, will be best understood from the following description of specific embodiments when read in connection with the accompanying drawing in which:

Figure 1:
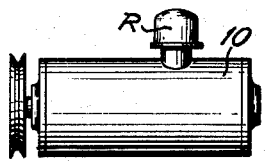
FIG. 1 is a diagrammatic illustration of a three-phase generator with the output voltage regulator mounted thereon.
Figure 2:
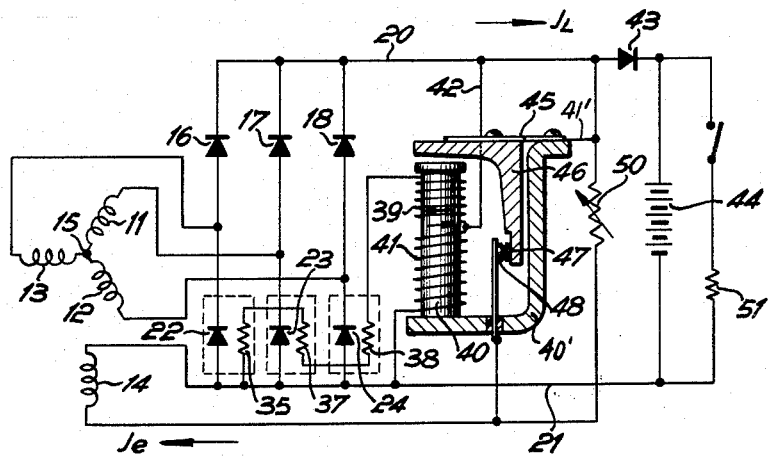
FIG. 2 is a schematic circuit diagram of the entire power supply system including the generator and the voltage regulator with certain mechanical details thereof.
Figure 3:
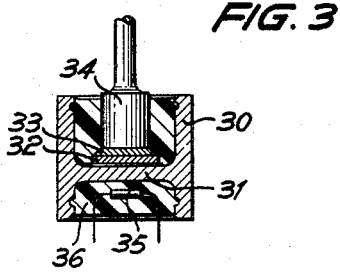
FIG. 3 is an axial section across one of the rectifiers preferably used in the arrangement.

The three-phase alternating current generator comprises, according to FIG. 2, within a housing 10, not shown in FIG. 2, three stator windings 11, 12 and 13, and a field or exciter winding 14 mounted on a rotatable armature, not shown. One end of the three stator windings 11, 12 and 13 is connected with those of the other windings at a central point 15. The three ends of the stator windings 11, 12 and 13 are taken to respective junction points which are connected across the rectifiers 16, 17 and 18, respectively, with the common positive output line 20. The same junction points are connected with the negative output line 21 across rectifiers 22, 23 and 24, respectively, polarized in the proper direction. As is illustrated in greater detail by FIG. 3, each of the rectifiers 22, 23, 24 constitutes an assembly as indicated by the dotted line frame surrounding it, a substantially tubular heat-dissipating housing or body 30 provided with a transverse web 31 and preferably made of formed copper, a silicon disc 32 being mounted by soldering on the web 31. The disc 32 contains a p-conductive zone or layer 33 produced by the introduction of aluminum as an alloying component, while the remainder of the disc 32 has n-conductivity so that the boundary or junction between these two portions of the semi-conductor disc has a rectifying effect. The above mentioned aluminum acts at the same time as a soldering agent for attaching the input electrode 34 to the disc 32, 33.

The housing 30 constitutes the second or output terminal of the rectifier. The empty space around the elements 32–34 is filled by an insulating filler material. In the hollow space below the web 31 a resistor element 35 is arranged and held in position by means of a cast filler material 36 of good thermal conductivity while insulating the resistor 35 from the wall of the housing 30 and the web 31. The resistor 35 is of the well known type made of semiconductor metal and known by the name thermistor with the capability of changing its resistance with changing temperatures.

As can be seen from FIG. 2 the thermistor 35 associated with the rectifier 22 is connected in series with the thermistor 37 similarly associated with the rectifier 23, and with the thermistor 38 similarly associated with the rectifier 24, as well as with a control coil 39 of the electro-magnetic regulator relay.

The regulator relay mainly comprises a core 40 mounted on a yoke 40′ which carries at its remote end a blade spring 45 which, in turn, carries a movable armature 46. The core 40 carries the already mentioned control coil 39 and the conventional voltage coil 41. One end of the voltage coil 41 is connected with the free end of the control coil 39 and the junction point therebetween is directly connected by line 42 with the positive output line 20. The other end of the voltage coil 41 is connected with the positive output line 20. A connection 41′ connects the line 20 with the yoke 40′ and thereby by spring 45 with the contact 47 carried by the armature 46 and cooperating with a stationary contact 48, insulated from the yoke 40′, but connected with one end of the exciter winding 14.

The other end of the exciter winding 14 is directly connected with the negative output line 21, while the first mentioned end of winding 14 is also connected across a variable resistor 50 with the positive output line 20. The latter is taken across a rectifier 43 acting as a return-current cutout and dimensioned for carrying the maximum occurring load current $J_L$ of the generator, to the positive terminal of the battery 44 which cooperates with the generator and is charged thereby. The negative terminal of the battery 44 is connected with the output line 21. Other current consumers supplied by the generator 10 and symbolized by the resistor 51 are connected in parallel with the battery 44.

In operation, when the generator 10 is started, in the case of a generator serving the lighting installation of a motor vehicle, upon the starting of the engine after having been standing still, the remanent magnetic field in the iron portions of the rotary armature produces in the stator windings 11, 12 and 13, comparatively small voltages which are rectified by the rectifiers 16, 17, 18 and 22, 23, 24. Consequently an exciter current $J_e$ can flow across the contacts 47 and 48 being in engagement with each other whereby the magnetic field in the generator is increased and higher alternating voltages are produced in the windings 11, 12, and 13. In this manner the generator is rapidly excited and produces between the positive and negative output lines 20 and 21, respectively, a direct current output voltage of such a value that now the current flowing through the voltage coil 41 is capable of causing attraction against the action of the spring 45 whereby the contacts 47 and 48 are separated. However, simultaneously a comparatively large current flows across the resistors 35, 37, 38 and through the control coil 39 which counteracts to a certain extent the magnetizing effect of the voltage coil 41. However, upon separation of the contacts 47 and 48 the variable resistor 50 connected in series with the exciter winding 14 causes a considerable reduction of the exciter current $J_e$. Consequently, the output voltage of the generator decreases somewhat but sufficiently to render the voltage coil 41 incapable of holding the armature 46 in its deflected position whereby the contacts 47, 48 were separated. Therefore the contacts engage such other again whereby the resistor 50 is shunted and rendered ineffective. This restores the previous condition and the cycle of regulation can repeat again.

The particular type of current regulation intended to be accomplished by means of the resistors or thermistors 35, 37, 38 and the control coil 39 is obtained in the following manner:

As soon as the rectifier output voltage of the generator available between the positive line 20 and the negative line 21 exceeds the voltage of the battery 44 a charging current $J_L$ can be applied to the battery across the rectifier 43. This current increases the more, the greater is the load or consumption constituted or determined by the current consumers 51. This current may reach values by which the temperature of the rectifiers 22, 23, 24 increases considerably. However this type of temperature-dependent resistors is sensitive to thermal overload and may be destroyed rapidly when a predetermined critical maximum temperature is exceeded. However the ohmic resistance of the control coil 39 is chosen in relation to the resistance values of the thermistors 35, 37 and 38, in such a manner that the current flowing through the thermistors and through the control coil and counteracting the action of the voltage coil 41 is considerably reduced as soon as the temperature of the rectifiers rises considerably. This is due to the fact that with increasing temperature the resistance of the individual thermistors increases very considerably as soon as a predetermined minimum temperature of about 80° C. is exceeded. Since during low rotary speeds of the generator only a weak cooling effect is derived from the ventilator in the generator for cooling the rectifiers, in this manner the voltage at the output of the generator will be regulated to so small a value that the load current $J_L$ cannot endanger the rectifiers. However, when the rotary speed of the generator is high, the regulating arrangement automatically corresponds to the capacity of the rectifiers to carry a higher load in view of the improved cooling effect so that in this case the generator is capable and permitted to carry a higher load.

It will be understood that each of the elements described above or two or more together, may also find a useful application in other types of a direct current supply system including an alternating current generator differing from the types described above.

While the invention has been illustrated and described as embodied in a direct current supply system including an alternating current generator, rectifier means and a voltage regulator, it is not intended to be limited to the details shown, since various modificaions and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a direct current supply system including direct current output terminals and an alternating current generator, in combination, rectifier means connected in circuit between the direct current output terminals and the alternating current output terminals of the generator for converting its alternating current voltage output into direct current output voltage; voltage regulator means connected between said direct current output terminals for regulating said direct current output voltage; and temperature-dependent control means structurally combined with said rectifier means and actuated by temperature increase of said rectifier means beyond a predetermined temperature, said control means being connected between one of said direct current output terminals and said regulator means so as to cause the latter to reduce said direct current output voltage when the temperature of said rectifier means exceeds said predetermined temperature.

2. In a direct current supply system including direct current output terminals and an alternating current generator, in combination, rectifier means connected in circuit between the direct current output terminals and the alternating current output terminals of the generator for converting its alternating current voltage output into direct current output voltage; voltage regulator means connected between said direct current output terminals for regulating said direct current output voltage; and temperature-dependent variable resistor means structurally combined with said rectifier means and actuated by temperature increase of said rectifier means beyond a predetermined temperature, said variable resistor means being connected between one of said direct current output terminals and said regulator means so as to cause the latter to reduce said direct current output voltage when the temperature of said rectifier means exceeds said predetermined temperature.

3. In a direct current supply system including direct current output terminals and an alternating current generator, in combination, rectifier means connected in circuit between the direct current output terminals and the alternating current output terminals of the generator for converting its alternating current voltage output into direct current output voltage; voltage regulator means connected between said direct current output terminals for regulating said direct current output voltage; and temperature-dependent variable resistor means structurally combined with said rectifier means and actuated by temperature increase of said rectifier means beyond a predetermined temperature, said variable resistor means being connected between one of said direct current output terminals and said regulator means and responding to temperatures above said predetermined temperature by a comparatively increased rate of change of its resistivity so as to cause said regulator means to reduce said direct current output voltage when the temperature of said rectifier means exceeds said predetermined temperature.

4. A system as claimed in claim 3, wherein said temperature-dependent variable resistor means is a thermistor having a pronounced positive temperature coefficient.

5. In a direct current supply system including direct current output terminals and three-phase alternating current generator means, in combination, a first and a second group of rectifier means connected in cricuit between the direct current output terminals and the alternating current output terminals, respectively, of the generator means for converting its alternating current voltage output into direct current output voltage; voltage regulator means connected between said direct current output terminals for regulating said direct current output voltage; and a plurality of temperature-dependent variable resistor means structurally combined with said rectifier means of one of said group thereof, respectively, and actuated by temperature increase of said rectifier means beyond a predetermined temperature, said variable resistor means being connected in series with each other and between one of said direct current output terminals and said regulator means and responding to temperatures above said predetermined temperature by a comparatively increased rate of change of its resistivity so as to cause said regulator means to reduce said direct current output voltage when the temperature of said rectifier means exceeds said predetermined temperature.

6. A system as claimed in claim 3, wherein said regulator means comprise an electromagnetic relay having a voltage coil connected between the output terminals of the generator, said generator including exciter means, and switch means connected in circuit with said exciter means of the generator and actuated upon energization of said relay, said relay having a second control coil connected in series with said resistor means between the output terminals of the generator.

7. A system as claimed in claim 5, wherein said regulator means comprise an electromagnetic relay having a voltage coil connected between the output terminals of the generator means, said generator means including exciter means, and switch means connected in circuit with said exciter means of the generator means and actuated upon energization of said relay, said relay having a second control coil connected in series with said resistor means between the output terminals of the generator.

8. A system as claimed in claim 3, wherein said resistor means are so adjusted with respect to the rectifier means associated therewith that the resistance/temperature characteristic thereof displays a maximum change of linearity at a temperature near the maximum permissible rectifier temperature and at least slightly below said rectifier temperature.

9. A system as claimed in claim 4, wherein said resistor means are so adjusted with respect to the rectifier means associated therewith that the resistance/temperature characteristic thereof displays a maximum change of linearity at a temperature near the maximum permissible rectifier temperature and at least slightly below said rectifier temperature.

10. A system as claimed in claim 5, wherein said resistor means are so adjusted with respect to the rectifier means associated therewith that the resistance/temperature characteristic thereof displays a maximum change of linearity at a temperature near the maximum permissible rectifier temperature and at least slightly below said rectifier temperature.

11. A system as claimed in claim 6, wherein said resistor means are so adjusted with respect to the rectifier means associated therewith that the resistance/temperature characteristic thereof displays a maximum change of linearity at a temperature near the maximum permissible rectifier temperature and at least slightly below said rectifier temperature.

12. A system as claimed in claim 7, wherein said resistor means are so adjusted with respect to the rectifier means associated therewith that the resistance/temperature characteristic thereof displays a maximum change of linearity at a temperature near the maximum permissible rectifier temperature and at least slightly below said rectifier temperature.

13. A system as claimed in claim 1, wherein said generator comprises a housing and ventilating means for producing a cooling air stream therethrough, and wherein said temperature-dependent control means are mounted within said housing so as to be exposed to said cooling air stream.

14. A system as claimed in claim 3 wherein said generator comprises a housing and ventilating means for producing a cooling air stream therethrough, and wherein said temperature-dependent resistor means are mounted within said housing so as to be exposed to said cooling air stream.

15. A system as claimed in claim 5, wherein said generator means comprises a housing and ventilating means for producing a cooling air stream therethrough, and wherein said temperature-dependent resistor means are mounted within said housing so as to be exposed to said cooling air stream.

16. A system as claimed in claim 6, wherein said generator comprises a housing and ventilating means for producing a cooling air stream therethrough, and wherein said temperature-dependent resistor means are mounted within said housing so as to be exposed to said cooling air stream.

17. A system as claimed in claim 7, wherein said generator means comprises a housing and ventilating means for producing a cooling air stream therethrough, and wherein said temperature-dependent resistor means are mounted within said housing so as to be exposed to said cooling air stream.

18. A system as claimed in claim 8, wherein said generator comprises a housing and ventilating means for producing a cooling air stream therethrough, and wherein said temperature-dependent resistor means are mounted within said housing so as to be exposed to said cooling air stream.

19. A system as claimed in claim 10, wherein said generator means comprises a housing and ventilating means for producing a cooling air stream therethrough, and wherein said temperature-dependent resistor means are mounted within said housing so as to be exposed to said cooling air stream.

20. A system as claimed in claim 12, wherein said generator means comprises a housing and ventilating means for producing a cooling air stream therethrough, and wherein said temperature-dependent resistor means are mounted within said housing so as to be exposed to said cooling air stream.

References Cited by the Examiner
UNITED STATES PATENTS

| | | | |
|---|---|---|---|
| 1,306,894 | 6/19 | Hanker | 322—34 |
| 1,633,671 | 6/27 | Leece. | |
| 2,992,383 | 7/61 | Hetzler et al. | |

LLOYD McCOLLUM, *Primary Examiner.*

MILTON O. HIRSHFIELD, *Examiner.*